United States Patent [19]
Sato

[11] 3,781,147
[45] Dec. 25, 1973

[54] SEALING DEVICE FOR A ROTARY INTERNAL COMBUSTION ENGINE
[75] Inventor: Munefumi Sato, Yokohama, Japan
[73] Assignee: Nisson Motor Company, Limited, Yokohama City, Japan
[22] Filed: Nov. 1, 1972
[21] Appl. No.: 302,722

[30] Foreign Application Priority Data
Nov. 13, 1971   Japan.............................. 46/106190

[52] U.S. Cl..................... 418/88, 418/94, 418/104, 418/142
[51] Int. Cl.... F01c 19/00, F04c 27/00, F01c 21/04
[58] Field of Search .................. 418/83, 88, 91, 94, 418/104, 142

[56] References Cited
UNITED STATES PATENTS
2,979,042   4/1961   Bentele .............................. 418/142
3,540,815   11/1970   Belzner et al...................... 418/142
3,590,790   7/1971   Keylwert et al..................... 123/8.01
3,706,514   12/1972   Ruf................................... 418/104

Primary Examiner—Al Lawrence Smith
Assistant Examiner—John J. Vrablik
Attorney—John Lezdey et al.

[57] ABSTRACT

A sealing device for a rotary internal combustion engine of the type adapted for effectively sealing the engine from oil leakage by utilizing blow-by gases from the engine. The sealing device comprises a source of air under pressure, and an air supply passageway formed in a housing of the engine which is connected to the source of air under pressure. The air supply passageway opens to a space in which the blow-by gases are introduced to urge an oil seal ring to a position to prevent leakage of oil from the engine and continuously supplies into that space air under pressure of constant pressure level from the source of air under pressure.

2 Claims, 1 Drawing Figure

PATENTED DEC 25 1973
3,781,147
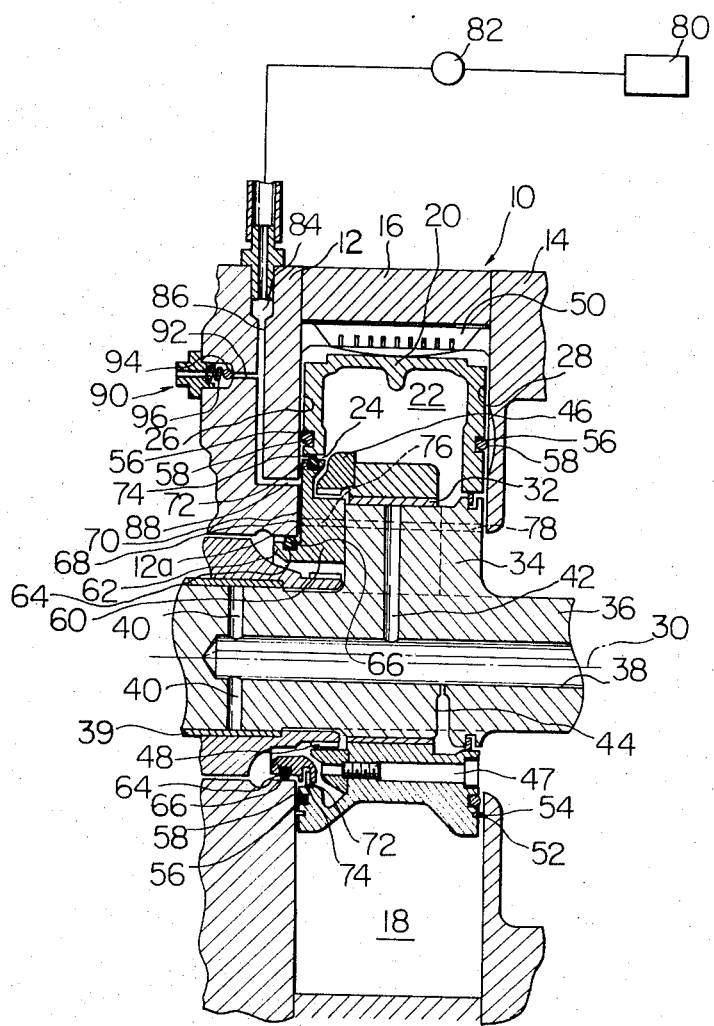

SEALING DEVICE FOR A ROTARY INTERNAL COMBUSTION ENGINE

This invention relates to sealing devices for rotary internal combustion engines and, more particularly, to an oil sealing device adapted to effectively maintain oil sealing contacts between adjacent chambers throughout various operating conditions of the engine.

In general, rotary internal combustion engines usually include a housing having axially spaced parallel internal end walls with substantially flat internal surfaces and a peripheral wall having an epitrochoidal internal cross-sectional shape defining a chamber therebetween. A rotor is journaled in the housing on an eccentric portion of a shaft which is coaxial with the chamber and journaled in bearings in the end walls. The rotor has a cavity formed therein and has substantially flat end faces facing adjacent inner flat faces of the end walls of the housing. The rotor also has a peripheral surface with a plurality of circumferentially spaced apex portions adapted for sealing engagement with the epitrochoidal internal wall of the casing to form a plurality of working chambers between the chamber and the rotor which vary in volume upon rotation of the rotor with respect to the housing. The rotor end faces are usually provided with annular grooves in which annular seals are inserted for sealing engagement with adjacent end wall inner faces of the housing for the purpose of preventing leakage of lubricating or cooling oil between the rotor end faces and the end walls. Cooling of the rotor during operation of the above described engine is carried out by supplying cooling oil into the cavity formed in the rotor. The cavity of the rotor opens in the axial direction against one of the inner flat faces of the housing end walls through an aperture formed in one of the rotor side end walls. An annular plate member 60 is disposed in the aperture of the rotor. This annular plate member has at its outer circumferential wall facing an inner circumferential wall of the aperture of the rotary piston formed with an annular groove in which an annular sealing ring is inserted for sealing the cooling oil within the cavity of the rotary piston. In order to assure the sealing function of this sealing ring, it has heretofore been proposed to urge the sealing ring in an axial direction toward an inner side wall of the annular groove by, introducing blow-by gases from the engine to a space defined between the one of the inner flat faces of the housing end walls and the end face of the annular plate member. A problem is encountered with this prior method in that the pressure of the blow-by gases acting on the sealing ring is reduced during braking action of the engine and, thus, it will be difficult to maintain sealing engagement of the sealing ring against the inner side wall of the annular groove resulting in leakage of the cooling oil past the sealing ring into the working chambers of the engine.

It is, therefore, an object of the present invention to provide a sealing device for a rotary piston internal combustion engine wherein the sealing device is capable of effectively sealing the rotor of a rotary internal combustion engine from oil leakage.

Another object of the present invention is to provide an oil sealing device for use in a rotary internal combustion engine wherein the sealing device functions effectively throughout the varying operating conditions of the engine.

Another object of the present invention is to provide an oil sealing device for use in a rotary internal combustion engine wherein the sealing device is adapted to continuously supply pressurized air at a constant pressure level into a space between the chamber end wall and an adjacent member of the rotor for urging a sealing means toward a position to provide a satisfactory sealing function to prevent leakage of cooling oil into the working chambers of the engine.

Still another object of the present invention is to provide an oil sealing device for use in a rotary internal combustion engine of the type having means for sealing the engine from oil leakage by utilizing blow-by gases from the engine.

A further object of the present invention is to provide an oil sealing device for use in a rotary internal combustion engine wherein the sealing device is simple in construction and economical to manufacture.

Briefly described, the present invention provides an improved and novel oil sealing device which is specifically suited for use in a rotary internal combustion engine comprising a housing having axially spaced parallel end walls having substantially flat internal surfaces and an epitrochoidal internal peripheral wall between the end walls, a rotor disposed in a chamber formed between the housing inner end walls and the epitrochoidal internal peripheral wall of the housing and the rotor having a cavity formed therein which opens through an aperture against one of the internal flat surfaces of the housing end walls, and an annular plate member disposed in the aperture of the rotor and having an annular groove formed on the circumferential wall of the annular plate member in which an annular sealing ring is inserted and urged in an axial direction against an inner side wall of the annular groove by blow-by gases introduced from the engine into a space between the one of the internal flat surfaces of the housing end walls and the adjacent surface of the annular plate member. In a preferred embodiment, the oil sealing device comprises a source of air under pressure, and an air supply passageway formed in one of the end walls of the housing and communicating with the source of air under pressure and the space between the one of the internal flat surfaces of the housing end walls and the adjacent end surface of the annular plate member to introduce air under pressure thereto for thereby urging the sealing ring in the axial direction toward the inner side wall of the annular groove formed in the annular plate member. The sealing device may also comprise a check valve which is located in the air supply passage for maintaining the air pressure to be applied on the sealing ring at a constant level irrespective of the varying operating conditions of the engine.

These and other features and advantages of the present invention will become more apparent from the following description when taken in conjunction with the single FIGURE which shows a preferred embodiment of the sealing device according to the present invention for use in a rotary internal combustion engine.

Reference will now be made in detail to the preferred embodiment of the present invention, an example of which is illustrated in the single FIGURE.

As shown, the rotary internal combustion engine comprises a housing 10 composed of axially spaced end walls 12 and 14, both having substantially flat inner faces, and a peripheral wall 16 disposed between and interconnecting the end walls to form a chamber 18 therebetween. The inner surface of the peripheral wall 16 has preferably an epitrochoid profile.

A rotor 20 is operatively disposed in the chamber 18 of the housing 10. The rotor 20 has a cavity 22 which is open toward the end wall 12 of the housing 10 through an aperture 24. The rotor 20 also has axially spaced end faces 26 and 28 disposed adjacent to the housing end walls 12 and 14. In addition, the rotor 20 has a plurality of circumferentially spaced apex portions, only one of which is shown (but not identified) in the drawing. The apex portions are in sealing engagement with the inner surface of the peripheral wall 16 to form a plurality of working chambers (not shown) between the rotor 20 and the housing 10. The geometrical axis of the rotor 20 is offset from and disposed parallel to the axis 30 of the housing 10.

In the engine illustrated, the rotor 20 is journaled in a bearing 32 on an eccentric portion 34 of a shaft 36, which is coaxial with the geometrical axis 30 of the cavity or chamber 18 of the housing 10 and which is journaled in a bearing 39. Extending axially through the shaft 36 is a longitudinal bore 38 which is connected with a source of rotor cooling oil (not shown) by conventional means. Radially extending bores 40 and 42 are formed in the shaft 36 and communicating with the longitudinal bore 38 for delivering cooling or lubricating oil to the bearings 39 and 32, respectively. An additional radially extending bore 44 is also formed in the shaft 36 and communicates with the cavity 22 of the rotor 20 for supplying cooling oil thereinto. Upon rotation of the rotor 20 relative to the housing 10 the working chambers (not shown) vary in volume.

In order to maintain the relative motion of the rotor 20 an internal gear 46 is, as illustrated, secured to the rotor 20 coaxially with the axis thereof by a connecting pin 47 and is disposed in mesh with an external gear 48 formed on the bearing 39. The external gear 48 is coaxial with the shaft 36.

Each of the apex portions of the rotor 20 has radially movable apex seal means 50 which are in continuous sealing engagement with the peripheral inner surface for efficient operation of the engine. Each of the end faces 26 and 28 has a plurality of grooves 52 therein adjacent to the periphery of the rotor 20 and running from one apex portion of the rotary piston 20 to the adjacent apex portion and a seal means 54 is received in each groove 52. Each of the end faces 26 and 28 of the rotor also has an annular groove 56 in which an oil seal ring 58 is disposed to prevent the cooling or lubricating oil from being admitted to the working chambers of the engine. Indicated by reference numeral 60 is an annular plate which is disposed adjacent to the end wall 12 of the housing 10 and which is fixed to the eccentric portion 34 for rotation therewith. The annular plate 60 is coaxial with the axis of the eccentric portion 34. This annular plate 60 includes a cylindrical extension 62 having formed at its outer circumferential periphery an annular groove 64 which receives threein an oil seal ring 66 sealingly engaging the inner peripheral wall of an aperture 12a formed in the end wall 12 of the housing 10 to prevent leakage of the cooling or lubricating oil past the inner wall of the aperture 12a. The annular plate 60 also includes a radially extending wall portion 68 having a radially extending face (not identified) disposed adjacent to the flat face of the end wall 12 of the housing 10. A space 70 is formed between the radially extending face of the annular plate 60 and the flat face of the housing end wall 12 and serves in a manner as will be described in detail hereinafter. The radially extending wall 68 of the annular plate 60 is formed at its outer circumferential periphery with an annular groove 72 which receives therein an oil sealing ring 74 in sealing contact with the inner peripheral wall of the aperture 24 of the rotor 20. For the purpose of assuring engagement between the inner side wall of the annular groove 72 and the radially facing surface of the oil sealing ring 74, blow-by gases under pressure are introduced from the engine into the space 70 formed between the inner flat face of the housing end wall 12 and the adjacent surface of the radially extending wall 68 through blow-by gas supply passages 76 and 78 provided in the annular plate 60 and the eccentric portion 34, respectively. With this arrangement, the pressure of the blow-by gases delivered from the engine is reduced in the course of engine braking action so that the oil sealing ring 74 is held in insufficient sealing contact with the inner side wall of the annular groove 72 resulting in leakage of the cooling or lubricating oil from the cavity 22 of the rotor 20. In this instance, the oil sealing ring 58 serves to additionally prevent the cooling or lubricating oil from leaking from the cavity 22 of the rotor and flowing in the working chambers of the engine. The engine working chambers can not be effectively sealed from the cooling or lubricating oil leaking from the cavity 22.

The present invention contemplates to continuously supply air at a constant pressure into the space 70 between the flat inner face of the housing end wall 12 and the adjacent surface of the radially extending wall of the annular plate 60 so as to force the oil sealing ring 74 in the axial direction toward the inner side wall of the annular groove 72 of the annular plate 60. To this end, a source 80 of air under pressure or an air pump is provided which is connected through a flow control valve 82 with an inlet 84 formed in the housing end wall 12. The housing end wall 12 is formed with an air supply passageway 86 communicating at its one end with the inlet 84 and at its other end with an outlet 88 formed in the housing end wall 12. The outlet 88 opens to the space 70 between the inner flat face of the housing end wall 12 and the adjacent surface of the radially extending wall of the annular plate 60 for supplying thereinto air under pressure delivered from the source 80 of air under pressure. To maintain the level of the pressure of air at a constant level irrespective of varying operating conditions of the engine, a relief valve 90 is located in a branch passageway 92 branched off from the air supply passageway 86. This relief valve may include a ball 94 and a compression spring 96 for biasing the ball 94 to a position to close the branch passageway 92. The flow control valve may be so arranged as to respond to a vacuum in the intake port (not shown) of the engine during decelerating operation of the engine thereby to control the flow of air under pressure passing therethrough in dependence on the variations in the intake vacuum.

During the operation of the engine, cooling of the rotor 20 is carried out by supplying the cooling oil to the cavity 22 of the rotor 20, from the source of cooling oil (not shown) through the longitudinal bore 38 and the radial bore 44 formed in the shaft 36. Depending on the speed of rotation of the rotor 20, the cooling oil supplied to the cavity 22 of the rotor 20 is affected by the centrifugal force, due to the revolution of the rotor 20, and tends to flow through the aperture 24 out of the cavity 22 of the rotor 20. If, in this instance, the pressure of the blow-by gases delivered from the engine is decreased, then the oil sealing ring 74 is not maintained in sealing contact with the side wall of the annular groove 72 of the annular plate by the pressure of the cooling oil in the cavity 22 of the rotor 20. This causes, during operation of the engine, leaking of the cooling oil past the oil sealing ring 74. According to the present invention, since air under pressure is continuously introduced into the space 70 between the flat inner face of the housing end wall 12 and the adjacent surface of the radially extending wall of the annular plate 60, the sealing effect between the oil sealing ring 74 and the side wall of the annular groove 72 of the annular plate 60 is satisfactorily maintained at all times irrespective of the varying operating conditions of the engine. Thus, the leaking of the cooling oil past the sealing ring 74 from the aperture 24 of the rotor 20 is entirely prevented.

It will now be appreciated from the foregoing description that the sealing device embodying the present invention is capable of effectively sealing the rotary internal combustion from oil leakage irrespective of the varying operating conditions of the engine whereby an efficient operation of the engine can be obtained continuously.

While only one preferred embodiment of the present invention has been herein shown and described in detail, it is to be understood that the present invention is not limited thereto. Various modifications and changes may also be made in the design and arrangements of the component parts without departing from the scope of the present invention as the same now is understood by those skilled in the art.

What is claimed is:

1. A rotary internal combustion engine comprising, in combination, a housing forming axially spaced internal end walls and an internal peripheral wall interconnecting said end walls to define a chamber therebetween, one of said end walls having an aperture formed therein; a shaft extending through said housing and having thereon an eccentric portion, said shaft having cooling oil bores; a rotor received within said chamber of said housing and supported on said eccentric portion of said shaft for eccentric rotation within said chamber of said housing, said rotor having an aperture formed therein which opens to said one of said end walls; an annular plate fixed to said eccentric portion of said shaft for rotation therewith, said annular plate including a cylindrical extension which is coaxial with the axis of said housing and a radially extending wall portion having a circumferential periphery facing said aperture of said rotor, said cylindrical extension and said radially extending wall portion having first and second annular grooves, respectively, said grooves each being defined by opposed radially facing side walls and a laterally extending bottom surface; first and second sealing rings received in said first and second annular grooves of said cylindrical extension and said radially extending wall portion of said annular plate, respectively, said first sealing ring sealingly engaging the circumferential wall of the aperture of said one of said housing end walls while said second sealing ring sealingly engages the circumferential wall of said aperture of said rotor; a blow-by gas supply passageway extending through said annular plate and said eccentric portion of said shaft for introducing blow-by gases from the engine to a space between said one of said housing end walls an an adjacent surface of said radially extending wall portion of said annular plate thereby to urge said second sealing ring toward one of said side walls of said second annular groove; an air supply passageway formed in said one of said housing end walls and communicating with said space between said housing end wall and said adjacent surface of said radially extending wall portion of said annular plate; and a source of air under pressure connected to said air supply passageway for supplying thereto air under pressure.

2. A rotary piston internal combustion engine as claimed in claim 1, further comprising a relief valve disposed in a branch passageway branched off from said air supply passage for maintaining the pressure of said air at a constant level.

* * * * *